United States Patent [19]

Paschke et al.

[11] 4,406,846

[45] Sep. 27, 1983

[54] FOAMED THERMOPLASTIC RESIN COMPRISING POLY(P-METHYLENEBENZOATE)

[75] Inventors: Edward E. Paschke, Wheaton; James L. Throne, Naperville, both of Ill.

[73] Assignee: Standard Oil Company (Indiana), Chicago, Ill.

[21] Appl. No.: 445,435

[22] Filed: Nov. 30, 1982

[51] Int. Cl.$^3$ .......................... B29H 7/29; C08J 9/10; C08J 9/14
[52] U.S. Cl. ........................................ 264/50; 264/54; 264/DIG. 83; 521/82; 521/90; 521/95; 521/97; 521/98; 521/138; 521/149; 521/182
[58] Field of Search ...................... 521/82, 90, 95, 97, 521/138, 149, 98; 264/50, 54

[56] References Cited

U.S. PATENT DOCUMENTS 4,130,719 12/1978 Cerefice et al. ..................... 528/361

Primary Examiner—Morton Foelak
Attorney, Agent, or Firm—William C. Clarke; William T. McClain; William H. Magidson

[57] ABSTRACT

Foamed thermoplastic resin comprising poly(p-methylenebenzoate) suitable for structural foam injection molded parts.

9 Claims, No Drawings

FOAMED THERMOPLASTIC RESIN COMPRISING POLY(P-METHYLENEBENZOATE)

FIELD OF THE INVENTION

The field of this invention relates to the preparation of foamed thermoplastic resin comprising poly(p-methylenebenzoate).

BACKGROUND OF THE INVENTION

Foamed thermoplastic resin comprising poly(p-methylenebenzoate) has not been previously prepared. Although p-hydroxymethylbenzoic acid, which is the monomer for poly(p-methylenebenzoate) has been known since as early as 1872 when the acid was prepared by free-radical bromination of p-toluic acid to p-bromomethylbenzoic acid, hydrolysis with aqueous barium hydroxide and subsequent purification by recrystallization from water, the low molecular weight of the resulting polymer made the polymer obtained from the acid unsuitable for use in foams. In general, it is known that molecular weight of a polymer must be sufficiently high to cause the resulting polymer to have good cell structure when foamed. Polymers having insufficient molecular weight, or insufficient melt strength, have been demonstrated to not have sufficient cell strength to form bubbles properly, the bubbles tending to deform and tear apart caused by lack of strength to withstand the inflation pressure of the bubble. Melt strength is correlated with measurement of inherent viscosity which, in turn, is used to measure molecular weight. An inherent viscosity (I.V.) of the polymer, which is lower than 0.4 dl/g, as measured in deciliters per gram (dl/g) in a 60/40 phenol/tetrachloroethane solvent at 30° C., is considered too low to allow proper cell formation of foamed poly(p-methylenebenzoate).

Polymers of p-hydroxymethylbenzoic acid having an inherent viscosity of at least 0.44 dl/g have been taught in commonly-assigned U.S. Pat. No. 4,130,719, but foamed thermoplastic resin comprising poly(p-methylenebenzoate) has not been previously prepared because choice of foaming agent had been found to be critical in preparing the foamed composition. Commonly-used foaming agents such as azodicarbonamide have been found to be deleterious when used to form poly(p-methylenebenzoate). Cell coalescence occurs because molecular weight of the polymer apparently decreases.

An object of this invention is to provide a foamed thermoplastic resin of poly(p-methylenebenzoate) having regular structure, good mechanical properties and unique molding characteristics.

A further object of this invention is to provide a process for providing a foamed thermoplastic resin of poly(p-methylenebenzoate) using a foaming agent suitable for the process. The process of thermoplastic structural foam injection molding is well known and adequately described in many sources, notably, J. L. Throne, "Principles of Thermoplastic Structural Foam Molding: A Review," 77–131, in N. P. Suh and N. H. Sung, eds., *Science and Technology of Polymer Processing*, MIT Press, 1979, which is incorporated by reference, and will not be repeated in detail here.

These and other objects will become apparent upon reading of the specification.

SUMMARY OF THE INVENTION

Foamed thermoplastic resin comprising poly(p-methylenebenzoate) has high shear sensitivity, slow rate of crystallization and inherently high impact resistance. The combination of properties makes the foamed poly(p-methylenebenzoate) suitable for high-speed molding of thin-wall parts requiring relatively thick skins and high impact resistance. The process of producing foamed poly(p-methylenebenzoate) requires an inert non-toxic foaming agent such as an inert non-toxic gas or a chemical foaming agent such as 5-phenyltetrazole which decomposes to produce an inert non-toxic gas and chemically inert by-products.

DETAILS OF THE INVENTION

A method has now been discovered by which it is possible to produce foamed injection-molded thermoplastic resin products of poly(p-methylenebenzoate) as a homopolymer, and with blends, and with interpolymers of poly(m-methylenebenzoate) and poly(alkyleneterephthalate) polymers, and to do so with conventional thermoplastic structural foam injection molding equipment operating at design capacity. The foams thus produced are characterized by uniform cell size in the foam core, substantial high density skins and high performance-to-weight ratio. The foamed products are predominantly poly(p-methylenebenzoate).

The foamed products can comprise poly(p-methylenebenzoate), and poly(m-methylenebenzoate), and/or poly(alkyleneterephthalate) as physical blends or mixtures of homopolymers of poly(p-methylenebenzoate), poly(m-methylenebenzoate) and poly(alkyleneterephthalates) in varying proportions.

The foamed products can comprise poly(p-methylenebenzoate) or poly(m-methylenebenzoate) with interpolymers of poly(p-methylenebenzoate), poly(m-methylenebenzoate) or poly(alkyleneterephthalates) in varying proportions.

Interpolymers are defined as polymer compositions intermediate between a physical blend and a totally random copolymer. Interpolymers occur due to the presence of other polyesters than poly(p-methylenebenzoate) or poly(m-methylenebenzoate) in the molding composition prior to the molding operation. The melt temperature of the molding operation, the percentage of each component and the time duration of the melt in the molding operation often determine the structure of the interpolymer and whether the polymer composition is that of a blend or of an interpolymer.

In the process of the invention, 100 parts by weight of homopolymer, and blending polymers, are mixed with a controlled amount of foaming agent. Typically for chemical foaming agents, 0.25–1 parts by weight yield adequate gas for foaming with the extreme limits being 0.01–10 parts by weight. The chemical foaming agent is typically mixed with the molding composition at room temperature, prior to charging the mixture to the hopper or inlet section of the plasticating screw of the injection molding machine. The mixture is then elevated in temperature and pressure until the polymer melts and the chemical blowing agent decomposes to produce gas. This mixture is then batchwise injected into a region of reduced pressure whereupon the gas thus produced expands the polymer to produce a cellular foam.

Further, 100 parts by weight of molding composition can be heated and melted and a chemical foaming agent, such as 5-phenyltetrazole which decomposes to form a gas, or a physical foaming agent comprising an inert non-toxic gas, such as nitrogen gas, carbon dioxide, linear hydrocarbons of from 2 to 8 carbon atoms, such as butane, pentane, halogenated hydrocarbons of from 1 to 6 carbon atoms, such as methyl chloride, ethyl chloride, or fluorocarbons such as dichlorodifluoromethane, 1,2-dichloro,1,1,2,2-tetrafluoroethane can be metered into the melt, typically at 5 parts by weight but within the limits of 0.01–50 parts by weight. The polymer melt-containing gas is then batchwise injected into a region of reduced pressure whereupon the gas expands the polymer to produce a cellular foam. Foaming level can be from about 0.001% to about 50%. A preferred range is from about 10% to about 50%. A more preferred range is from about 10% to about 40%. A most preferred range is from about 15% to about 25%.

The term "foaming level" is a measure of the foam bulk density relative to the bulk density of the unfoamed material. Foaming level is measured in terms of reduced density of the material according to the following:

$$\text{Reduced Density} = \frac{\text{Bulk Density of Foamed Material}}{\text{Bulk Density of Unfoamed Material}}$$

$$\text{Foaming Level} = (1 - \text{Reduced Density}) \times 100$$

The preferred temperature of the resin-gas mixture just prior to injection is 250°–300° C. at an injection pressure of 100–2000 psi, typically about 400–500 psi. When the temperature and pressure conditions are noticeably outside these ranges, certain foaming agents can fail to perform satisfactorily. At temperature appreciably below 250° C., the plastic may not melt and/or the particular chemical foaming agent selected may not fully decompose, thus yielding an unprocessible system. If pressures fall below about 400 psi the gas may not be thoroughly dissolved in the polymer, thus causing very ragged cells to be found in the final part.

The thermoplastic structural foam process, as currently practiced in injection molding, is used to fabricate large, relatively thick-wall structures. The process requires relatively long cooling times, on the order of minutes. As a result, extant processing machinery melts and stores large quantities of polymer-gas mixture prior to each processing injection into the mold cavity. Thus the polymer-gas mixture must remain thermally stable at processing temperatures (and pressures) for several minutes. An informal stability criterion is time-temperature, obtained by multiplying the melt temperature (°C.) by the residence time (sec) at this temperature prior to injection. A typical operating range for this criterion is 5,000–30,000 (°C.-sec) with upper limit being 60,000 (°C.-sec).

The term "homopolymer" as used in this specification and claims means a poly(p-methylenebenzoate) having an I.V. of at least 0.4 dl/g, preferably from 0.5 to 0.7 I.V. The term blending polymer means a poly(m-methylenebenzoate) and any poly(alkyleneterephthalate) of the structural formula

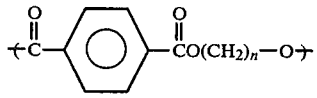

wherein n is a whole number from 2 to 20, wherein the ratio of poly(p-methylenebenzoate) to the blending polymer is from about 99.1:0.9 to about 80:20. The poly(alkyleneterephthalate) wherein the alkylene moiety is from 2 to 20 carbons atoms can be selected from the group consisting of poly(ethyleneterephthalate), poly(-butyleneterephthalate), etc. up to poly(eicoseneterephthalate). The poly(alkyleneterephthalate) is preferably poly(ethyleneterephthalate). The above compositions can exist as blends in the above ranges or as compositions of poly(p-methylenebenzoate) and poly(m-methylenebenzoate) with interpolymers as defined previously in the same ranges.

Foams obtained by the invented process have high shear sensitivity, slow rate of crystallization and high impact resistance. These properties cause the foam to be suitable as a structural foam material for high speed injection molding of thin-wall parts and articles requiring relatively thick skins and high impact resistance. Typical molded parts and articles of the above description are refrigerator and freezer inner liners, small appliance parts, sporting equipment and equipment housings.

The foaming agents most useful in this invention are nitrogen gas, fluorocarbons and certain chemical foaming agents which achieve their effect by thermal decomposition. The preferred agents are those with a boiling point of from $-30°$ C. to $100°$ C. under standard conditions. Typical examples of useful organic foaming agents are dichlorodifluoromethane, 1,2-dichloro-1,1,2,2-tetrafluoroethane, monochlorotrifluoromethane, and 5-phenyltetrazole.

Chemical foaming agents which achieve their effect by thermal decompositions are generally suitable for use in this invention although certain exceptions exist such as azodicarbonamide. Characteristically, the ideal chemical foaming agent decomposes to produce an inert, non-toxic gas, and by-products that are chemically inert. Certain chemical foaming agents such as azodicarbonamide liberate small amounts of ammonia which is known to be aggressive with many condensation polymers. Similarly certain chemical blowing agents liberate small amounts of water, which is known to hydrolyze certain condensation polymers. Further, some of the residual side reaction by-products may cause deterioration in the resin properties. These chemical foaming agents in the course of performing their function generate gases such as nitrogen and carbon dioxide which have extremely low boiling points under normal pressure.

The process of the present invention can be carried out in the presence of the usual additives generally employed in the production of foamed products. These include, for example, cell diameter regulators, foam stabilizers, flame retardants and coloring agents. Such products are utilized in the amounts normally employed with conventional foams.

The following non-limiting examples are given by way of illustration only.

EXAMPLE I

One hundred parts by weight of dried poly (p-methylenebenzoate) having a nominal I.V. of 0.64 and in the form of ⅛" (nominal) dimensioned pellets were tumble-blended for 15 minutes at room temperature with 0.5 parts by weight Celogen AZ, a commercial azodicarbonamide, a product of Uniroyal Chemical, Div. of Uniroyal, Inc., Naugatuck, Conn., 06770, in the form of a freely-flowing powder. The dry mixture was added to the hopper of a Boy I5S injection molding machine containing a mold that produced an edge-gated plaque of dimensions 67 mm by 99 mm by 2.54 mm thick. The molding conditions are those given in column 1 of Table I. With the exception of the last plaque molded, each part experienced at least a 30-second injection time and a 30-second cure time. For the last plaque molded, an additional 60 seconds of hold time at melt conditions were added to simulate typical structural foam time temperature processing conditions. The impact resistance of 100 mil plaques using Gardner drop weight testing system is shown in Table II, third column. The plaque specific gravity was 1.11, or the plaques had a foaming level of 15%. The cross-section of the plaque was characterized by high density skins (nominally) 0.75–1.4 mm in thickness and a low density foam core having cells (nominally) 0.05–0.10 mm in dimension uniformly distributed across the cross-section. The I.V. of the plaque dropped to 0.43 after 16,000 (°C.-sec) and 0.42 after 40,000 (°C.-sec).

EXAMPLE II

Example I was repeated, but instead of allowing the plastic to produce a foamed part, the mold was completely filled with plastic under sufficient pressure so that the gas was either vented or redissolved in the plastic. The processing conditions were identical to those of column 1 of Table I. The Gardner drop weight impact data are shown at the bottom of column 2 of Table II. The specific gravity of the plaque was 1.31 or nearly equal to the specific gravity of 1.33 for a molded part containing no volatile gas. It was thus assumed that the azodicarbonamide, the decomposition by-products and/or the generated gases caused deterioration in molecular weight.

EXAMPLE III

Example II was repeated, but in a different machine and mold configuration. One hundred parts by weight dry poly(p-methylenebenzoate) having a nominal I.V. of 0.64 was tumble-blended for 15 minutes with 0.5 parts by weight Celogen AZ (azodicarbonamide) and this mixture was added to the hopper of a Boy 15/7 injection molding machine containing a mold that produced a flexural bar 127 mm by 12.7 mm by 3.18 mm thick and a tensile bar 184 mm by 19 mm (grip) by 12.7 mm (neck) by 3.18 mm thick. The processing conditions were those shown in column 2 of Table I, and the mold was again filled completely with plastic. The measured tensile and flexural properties are given in column 2 of Table II. No tensile yield was observed, indicating a brittle polymer, and confirming azodicarbonamide chemical foaming agent aggressiveness with poly(p-methylenebenzoate). The I.V. of the molded flexural and tensile bars was 0.45 at 16,000 (°C.-sec) and 0.42 at 40,000 (°C.-sec).

EXAMPLE IV

Example I was repeated, except that 5-phenyltetrazole, a commercial chemical foaming agent, Expandex 5-PT, a product of Olin Corp., Chemical Group, Stamford, Conn., 06904, was substituted for Celogen AZ. The fine freely-flowing powder, 5-phenyltetrazole, was added at 0.5 parts by weight. The molding conditions were identical to those given in column 2 of Table I. The initial resin I.V. was 0.59. The mold plaques were impact tested and the data are shown in Table II, fifth column. The plaque specific gravity was 1.11 or the plaques had a foaming level of 17%. The cross-section appearance was similar to that of Example I. The I.V. of the plaque was 0.50 after 40,000 (°C.-sec) processing exposure.

EXAMPLE V

Example II was repeated except that 5-phenyltetrazole replaced azodicarbonamide as a chemical foaming agent. The processing conditions were identical to those of column 1, Table I. The Gardner drop weight impact data were shown at the bottom of column 4 of Table II. The specific gravity of the plaque was 1.33, identical with that of a molded part containing no volatile gas.

EXAMPLE VI

Example III was repeated except that 5-phenyltetrazole replaced azodicarbonamide as a chemical blowing agent at the same weight per weight of polymer. The processing conditions were identical to those shown in column 2 of Table I. The measured tensile and flexural properties are given in column 4 of Table II. The I.V. of the molded bars was 0.53 at 16,000 (°C.-sec) and 0.47 at 40,000 (°C.-sec).

EXAMPLE VII

Example V was repeated except that poly (p-methylenebenzoate) was molded without a foaming agent, according to processing conditions given in column 1 of Table I. The Gardner drop weight impact data are shown at the bottom of Table II. The I.V. of the molded plaques was 0.53 at 16,000 (°C.-sec).

EXAMPLE VIII

Example III was repeated except that the polymer was molded without a foaming agent, according to the processing conditions given in column 2 of Table I. The measured tensile and flexural properties are given in column 1 of Table II. The I.V. of the molded bars was 0.55 at 16,000 (°C.-sec).

TABLE I

Molding Conditions for PPMB and Chemical Foaming Agents

| | MOLDING CONDITIONS | |
| --- | --- | --- |
| | Plaques | Flex, and Tensile Bars |
| Machine | Boy 15S with Shutoff Nozzle | Boy 15/7 with Shutoff Nozzle |
| Front Zone | 277° C. | 277° C. |
| Rear Zone | 266° C. | 266° C. |
| Injection Pressure | 400–410 psi | 700 (5PT); 800 (others) |
| Cure Time | 30 sec* | 30 sec* |
| Injection Time | 30 sec | 30 sec |
| Screw Speed | 100 RPM | 100 RPM |
| Injection Speed | Max | Max |
| Cushion (solid) | ⅛" | ⅛" |
| Back Pressure | 0 | 0 |
| Feed (solid) | 56 mm | 64 mm |
| Feed (foam) | 47 mm | 52 mm |
| Mold Cooling | None | Max |
| Mold Temp (fixed) | 105 ± 5° F. | 88° F. |
| Mold Temp (moving) | 105 ± 5° F. | 89° F. |
| Throat Cooling | Max | None |

*Last shot for each foaming agent was made with 1.5 min residence time at melt conditions.

TABLE II

PPMB and Chemical Foaming Agents

| Part Made | PPMB (only) TFP | With AZ Packed Out TFP | With AZ Foamed P | With 5PT Packed Out TFP | With 5PT Foamed P |
|---|---|---|---|---|---|
| Density (Avg.) | 1.33 | 1.31 | 1.11 | 1.33 | 1.11 |
| Foaming Level, % | — | — | 15 | — | 17 |
| I.V. of Part | 0.55 | 0.45 | 0.43 | 0.53 | 0.50 |
| Tensile Strength | | | | | |
| Yield, psi | 7,500 | N.D. | — | 4.4 | — |
| Ultimate, psi | 6,700 | 6,800 | — | 6,400 | — |
| Elongation | | | | | |
| Yield, % | 4.5 | N.D. | — | 4.4 | — |
| Ultimate, % | 375 | 2.6 | — | 164 | — |
| Tensile Modulus, | | | | | |
| Tangent × 10³ psi | 289 | 328 | — | 311 | — |
| Flex Strength, psi | | | | | |
| Yield | 11,900 | 11,700 | — | 11,700 | — |
| Flex Modulus, | | | | | |
| Tangent × 10³ psi | 322 | 315 | — | 314 | — |
| 100 Mil Plaque Gardner Drop | | | | | |
| Impact, in-lb | 7,184 | 2.8 | 1.4 | 21 | 20 |

Notes:
N.D.—Not determined
TFP—Tensile Bars, Flex Bars, Plaques
P—Plaques
I.V.—Inherent Viscosity Note that "injection time" noted in Table I is the sum of the waiting time between the ejection of the last part and the initiation of injection for the next part and the actual time of injection which typically was 1–2 seconds. Typical thermoplastic structural foam molding operations require more than 60 seconds to cool the molded part. During this time the next shot of plastic is being held at the melt temperature. As a result, polymer degradation, as evidenced by a loss in molecular weight and/or as measured as inherent viscosity (I.V.) can occur. The poly(p-methylenebenzoate) used in this study had no stabilizer package with it although it was thoroughly vacuum dried at 120° C. for up to 24 hours at less than 1 mm Hg vacuum and sealed hot in metal containers prior to molding. At 16,000 (°C.-sec) hold time, the 0.64 I.V. material, as received, was reduced in I.V. to 0.55, indicating some deterioration in molecular weight with time at typical thermoplastic structural foam injection molding conditions.

Very low injection pressures were needed to inject this material, indicating that high speed filling of thin-wall structural foam parts can be achieved.

What is claimed is:

1. A process for preparing a thermoplastic foamed resin product comprising a polymer composition of poly(p-methylenebenzoate) wherein said polymer is foamed in the presence of a foaming agent selected from the group consisting of an inert, non-toxic gas and a chemical foaming agent which thermally decomposes to produce an inert, non-toxic gas.

2. The process of claim 1 wherein said foaming agent is present in an amount from about 0.01 to about 10 parts by weight per 100 parts by weight of polymer.

3. The process of claim 1 wherein said foaming agent is selected from the group consisting of nitrogen gas, carbon dioxide, linear hydrocarbons of from 2 to 8 carbon atoms, halogenated hydrocarbons of from 1 to 6 carbon atoms, dichlorodifluoromethane, 1,2-dichloro, 1,1,2,2-tetrafluoroethane, monochlorotrifluoromethane and 5-phenyltetrazole.

4. The process of claim 1 wherein said foaming agent is 5-phenyltetrazole.

5. The process of claim 1 wherein said thermoplastic foamed resin product is converted to an injection molded article.

6. The process of claim 1 wherein said polymer composition comprises poly(p-methylenebenzoate) and a polymer selected from the group consisting of poly(m-methylenebenzoate), a poly(alkyleneterephthalate) wherein the alkylene moiety has from 2 to 20 carbon atoms and mixtures thereof, and ratio of said poly(p-methylenebenzoate) to said polymer is within the range of from about 99.1:0.9 to about 80:20.

7. The process of claim 6 wherein said poly(alkyleneterephthalate) is selected from the group consisting of poly(m-methylenebenzoate), poly(ethyleneterephthalate), poly(butyleneterephthalate) and mixtures thereof.

8. The process of claim 6 wherein said polymer composition comprises a physical blend.

9. The process of claim 6 wherein said polymer composition comprises an interpolymer.

* * * * *